W. K. PORTER.
BRAKE MEANS.
APPLICATION FILED APR. 5, 1921.
1,418,167.
Patented May 30, 1922.
2 SHEETS—SHEET 2.
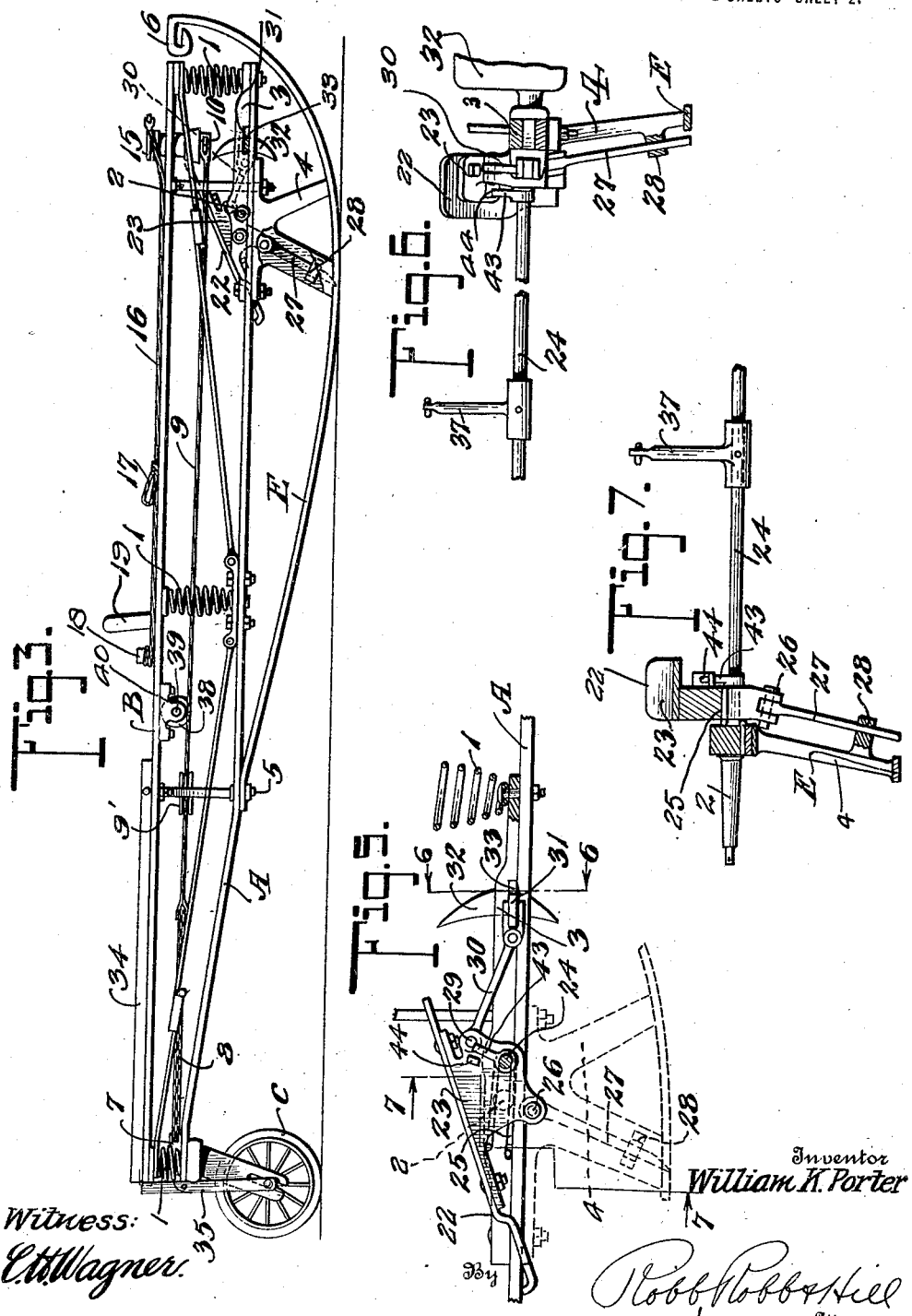
Witness:
C.H.Wagner.
Inventor
William K. Porter
By
Robb, Robb & Hill
Attorneys

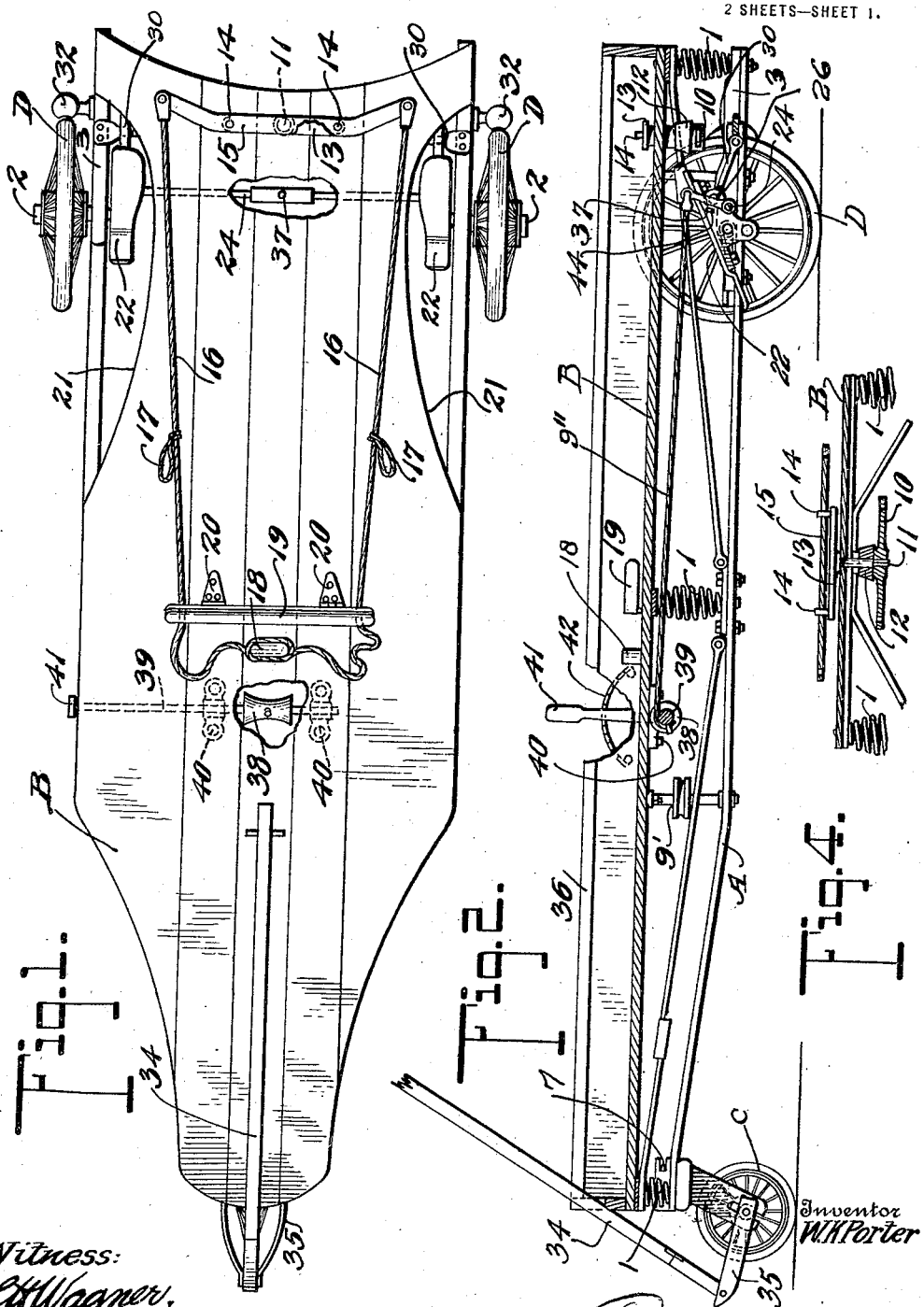

UNITED STATES PATENT OFFICE.

WILLIAM K. PORTER, OF PITTSBURGH, PENNSYLVANIA.

BRAKE MEANS.

1,418,167.

Specification of Letters Patent.  Patented May 30, 1922.

Original application filed June 30, 1920, Serial No. 392,984. Divided and this application filed April 5, 1921. Serial No. 459,011.

*To all whom it may concern:*

Be it known that WILLIAM K. PORTER, citizen of the United States, residing at Pittsburgh, in the county of Allegheny and State of Pennsylvania, has invented certain new and useful Improvements in Brake Means, of which the following is a specification.

The present invention relates to a brake mechanism and more particularly to a brake mechanism for a convertible sled and wheeled vehicle such as shown in my co-pending application Serial No. 392,984, filed June 30, 1920, the present application being a division of said co-pending application.

An object of the invention is to provide a brake mechanism having one set of braking means adapted to be brought into operation when the vehicle is used as a coaster wagon or express wagon and another set of braking means adapted to be brought into operation when the vehicle is used as a sled.

Another object of the invention is to provide a brake mechanism having brake operating means permanently mounted upon the vehicle body and wheel brakes and sled brakes adapted to be interchangeably connected to said operating means.

A further object of the invention is to provide a brake mechanism having foot operated means for operating the braking means when the vehicle is used as a sled or coaster wagon, and hand operated means for operating the braking means when the vehicle is used as an express wagon.

With these and other objects in view, which will more fully appear as the description proceeds, the invention consists in certain combinations and arrangements of parts, the novel features thereof being pointed out in the appended claims.

For a full understanding of the invention, reference is to be had to the following description and accompanying drawings in which:

Figure 1 is a top plan view of a convertible vehicle showing the same assembled for use as a wheeled vehicle and having my improved brake mechanism applied thereto, certain parts being broken away for clearness of illustration.

Figure 2 is a longitudinal section through the vehicle shown in Figure 1 when converted into an express wagon, portions being broken away and shown in section to illustrate more clearly the details of the brake mechanism.

Figure 3 is a side elevation of the vehicle when converted into a sled.

Figure 4 is a transverse sectional view showing certain details of the steering mechanism.

Figure 5 is an enlarged detail view of one of the treadle controlled brake devices.

Figure 6 is a transverse sectional view on the line 6—6 of Figure 5 looking in the direction of the arrows.

Figure 7 is a detail view on the line 7—7 of Figure 5 looking in the direction of the arrows.

Corresponding and like parts are referred to in the following description and indicated in all of the views of the drawings by like reference characters.

Specifically describing the particular embodiment of the invention illustrated by the drawings, the reference character A designates a skeleton lower frame which is preferably tapered at one end. Arranged above the skeleton frame A is the bottom board B which is yieldably supported by coil springs 1 and suitable braces which permit the bottom board to move towards and away from the frame but prevent relative longitudinal and transverse movements of these parts, this detail structure forming no part of the present invention.

One end of the frame is mounted upon a castor wheel C which is adapted to be manipulated to steer the vehicle. The other end of the frame may be supported by a pair of main wheels D as indicated by Figures 1 and 2, or by sled runners E, as indicated by Figure 3, the wheels and sled runners being removable for substitution one for the other. The main wheels D are journaled upon stub shafts 2 projecting from brackets 3 which are bolted to the sides of the skeleton frame A. These main wheels D can be removed and the sled runners E placed in position by bolting the runner supports 4 and runners E to the frame as shown in Figure 3. Intermediate portions of the sled runners are secured to the arms of the forked brackets or standards 4 which project downwardly from the skeleton frame. When the vehicle is used as an express wagon the end having the castor wheel is the front end, but when it is used as a coaster wagon or sled the opposite end becomes the front end. The rear ends of the sled runners are inclined upwardly and bolted at 5 to the skeleton frame, while the forward ends thereof are curved upwardly at the front of the frame and rebent at 6. The forked brackets 4 for the sled runners are detachably bolted to the skeleton frame A and removed with the runners when the latter are detached.

To the upper end of the pivot pin for the castor wheel C is attached a sprocket wheel 7 which is arranged just above the skeleton frame A. A sprocket chain 8 extends around the sprocket wheel and to the ends of the sprocket chain are fastened one end of a pair of cables 9 which after engaging the sides of a guide pulley 9' cross each other and have their opposite ends attached to the ends of a lower cross bar 10 on a steering shaft 11. The steering shaft 11 is vertically disposed and extends upwardly through the body board B, being suitably journaled within a bearing 12. The upper end of the steering shaft 11 terminates in a cross head 13 (see Figure 4) having studs 14 at the opposite ends thereof, said studs being adapted to engage openings in an upper cross bar 15 which is removably held in position thereby. The ends of a steering cable 16 are connected to the upper cross bar 15. The cable 16 may be provided with suitable hand loops 17 and any surplus length of the cable may be wound upon a post 18 arranged at the rear of a back rest 19. This back rest is hinged at 20 to the body board B and may be swung downwardly against the same when not in use. With this construction it will be obvious that the operator or driver will seat himself upon the body part B with his back against the back rest 19 and grasp the hand loop 17 of the steering cable 16 in order to direct the movements of the vehicle by the castor wheel and turn it to the right or to the left as may be desired.

By reference to Figure 1 it will be observed that the sides of the body board B are cut away at 21 to provide clearance spaces which enable the operator or driver to place his feet upon the treadles or foot plates 22 (see Figures 5, 6 and 7). The foot plates 22 are rigid with blocks 23 which are loose upon opposite ends of a transverse shaft 24, the ends of the shaft being received within the brackets 3 bolted to frame A. Springs 25 surround the shaft 24 and each spring has one end thereof secured to the frame, while the other end thereof bears against the foot plate 22 in such manner as to resist the depression of the foot plate when pressure is applied thereto. The blocks 23 may be connected by pivot pins 26 to downwardly extending plungers 27 which are adapted to be projected below the sled runners E to act as brakes when the runners E are in position. These plungers 27 pass loosely through guides 28 projecting from the inner sides of the brackets 4 which are utilized to secure the sled runners in position. The blocks 23 are also adapted to be connected by pivot pins 29 to brake arms 30 which are rigidly connected to slides 31 carrying brake shoes 32 which are adapted to engage the wheels D. The slides 31 are shown as mounted within slots 33 in the ends of the brackets 3. It will be obvious that when either foot plate 22 is depressed the rocking movement imparted to the block 23 will pull rearwardly upon the arm 30 and bring the corresponding brake shoe 32 into engagement with the wheel D. The two foot plates 22 may be operated either simultaneously or independently of each other. For a purely braking action the two foot plates will be operated simultaneously although when it is desired to assist the castor wheel in steering and to make a quick turn the brakes may be operated independently of each other. This is true whether the wheels D or the sled runners E are in position. The sled brakes 27 are disconnected by withdrawing pins 26 and removed with the sled runners when the wheels D are used. Both sets of brakes, however, are arranged to be connected to be operated by the foot plates 22.

When the vehicle is used as an express wagon or coaster wagon a tongue 34 formed in hinged sections is applied to the castor wheel. The hounds 35 of the tongue are adapted to be detachably mounted upon the ends of the castor wheel axle. The tongue can be readily detached when it is not desired to use the same, as when the steering is performed by the steering bar 15. With the tongue 34 in position the device can be readily used as an express wagon, and for this purpose side boards 36 may be provided for application to the edges of the body board B. When the device is used as an express wagon the upper cross bar 15 of the steering device is removed, together with the steering cable 16, and the sprocket chain 8 and cables 9 are also removed. One of the cables shown at 9 may have one end thereof connected to a crank arm 37 at the middle of the transverse shaft 24 upon which the brake mechanism is mounted, and the other end thereof secured to a reel 38 on a transverse shaft 39 which extends under the body board B and is journaled in suitable bearings 40. A handle 41 is secured to one end of the transverse shaft 39 and a conventional rack 42 is provided for engagement with the handle to lock it in adjusted position. This rack being attached to the side board is, of course, removable with it. By suitably swinging this handle or lever the cable can be wound upon the reel 38 and the transverse shaft 24 rotated to cause arms 43 one on each side to engage and rotate the blocks 23 of the foot plates 22. These arms 43 which project laterally from the shaft are swung into inoperative position when the device is used as a coaster and the brakes are applied by the foot plates 22. However, when the device is used as an express wagon and the crank arm 37 of the shaft 24 is connected by a cable to the reel 38, the arms 43 are brought into engagement with shoulders 44 on the blocks 23 so that when the shaft is rotated the blocks 23 will be moved to bring the brake shoes into engagement with the wheels. The same brakes are utilized although they are controlled from a different source.

The parts can be readily interchanged, as will be apparent from the foregoing description, to permit of the device being used as a sled, coaster wagon or express wagon. The device can be steered with facility in either direction, and when the brake and steering means are used in conjunction a change in direction in long graceful curves or an abrupt or complete turn can be made when desired. This feature will add greatly to the pleasure of coasting and will also be of assistance in preventing collisions and coasting accidents.

Having thus described my invention, what I claim and desire to secure by Letters Patent is:

1. In a convertible sled and wheeled vehicle including a main frame and interchangeable sled runners and wheels, brake operating means mounted upon said main frame, and sled and wheel brakes adapted to be interchangeably connected to the brake operating means.

2. In a convertible sled and wheeled vehicle including a main frame and interchangeable sled runners and wheels, foot plates pivotally mounted on the frame, and sled and wheels brakes adapted to be interchangeably connected to the foot plates.

3. The combination with a vehicle including a frame, of a shaft mounted on said frame, brake operating members loose upon said shaft, brakes connected to said brake operating members, means for rotating said shaft, and means for simultaneously operating the brake operating members when the shaft is rotated.

4. The combination with a vehicle including a main frame, of a shaft mounted on said frame, brake operating members loose upon said shaft, foot plates operatively connected to the brake operating members to operate the same either simultaneously or independently of each other, brakes connected to the brake operating members, means for rotating the shaft, and means for simultaneously operating the brake operating members when the shaft is rotated.

5. The combination with a vehicle including a main frame, of a shaft mounted on said frame, brake operating members loose upon said shaft, brakes connected to the brake operating members, means for operating the brake operating members either simultaneously or independently of each other, means for rotating said shaft, and means for simultaneously operating the brake operating members when the shaft is rotated.

6. The combination with a vehicle including a main frame, of a shaft mounted on said frame, brake operating members loose upon said shaft and formed with shoulders, brakes operatively connected to the brake operating members, means for operating the brake operating members either simultaneously or independently of each other, means for rotating the shaft and pins projecting from the shaft and adapted to engage the shoulders of the brake operating members to operate the said members simultaneously.

7. The combination with a vehicle including a main frame, of a shaft mounted on said frame, brake operating members loose upon said shaft, foot plates connected to the brake operating members for moving the same either simultaneously or independently of each other, brakes connected to the brake operating members, a second shaft arranged in spaced relation to the first shaft, an operating member for the second shaft, an operative connection between the two shafts, and means for simultaneously operating the brake operating members when the second shaft is operated.

8. In a convertible sled and wheeled vehicle including a main frame and interchangeable sled runners and wheels, a brake operating member mounted upon the frame, a foot plate operatively connected to the brake operating member, an upright plunger adapted to be connected to the brake operating member and used with the sled runners as a brake, a slide mounted upon the frame and adapted to be operatively connected to the brake operating member, and a brake shoe adapted to be connected to the slide for engaging a wheel.

9. In a convertible sled and wheeled vehicle including a main frame and interchangeable sled runners and wheels, a shaft mounted transversely of said frame, brake operating members pivoted loosely upon said shaft, foot plates operatively connected to the brake operating members, upright plungers adapted to be pivotally connected to the brake operating members for braking the vehicle when used as a sled, wheel brakes adapted to be operatively connected to said brake operating members when the vehicle is used as a wagon, means for operating said shaft, and means for simultaneously operating the brake operating members when the shaft is rotated.

In testimony whereof I affix my signature.

WILLIAM K. PORTER.